March 23, 1943.  F. A. DEXTER  2,314,775
CUTTER HEAD
Filed Oct. 24, 1941

Inventor
Frederick A. Dexter
By Ritter, Machlin & Muir
his Attorneys

Patented Mar. 23, 1943

2,314,775

UNITED STATES PATENT OFFICE 2,314,775

CUTTER HEAD

Frederick A. Dexter, Orange, Mass., assignor to The Leavitt Machine Company, Orange, Mass., a corporation of Massachusetts Application October 24, 1941, Serial No. 416,419

2 Claims. (Cl. 90—12.5)

My invention relates to cutter heads for attachment to the spindles of valve resurfacing tools and its principal object is to provide a combined cutting blade holder and pilot.

Another object of the invention is to provide a cutter head in which the pilot for centering the head is located above the cutting blade for resurfacing the valve seat.

A primary feature of the invention consists in providing a cutter head having a slot adjacent its lower end for receiving a cutting blade and a cylindrical portion adjacent its upper end for centering the head with respect to the valve seat to be operated upon.

A further feature of the invention consists in providing a cutter head comprising a unitary member provided with a diametral slot in its lower end for receiving a cutting blade and with a cylindrical portion at its upper end for centering the head with respect to the valve seat to be operated upon, the diameter of the cylindrical portion being greater than the length of the cutting blade.

Other and more specific features of the invention, residing in advantageous forms, combinations and relations of parts, will hereinafter appear and be pointed out in the claims.

In the drawing, illustrating a preferred embodiment of the invention,

Figure 1:
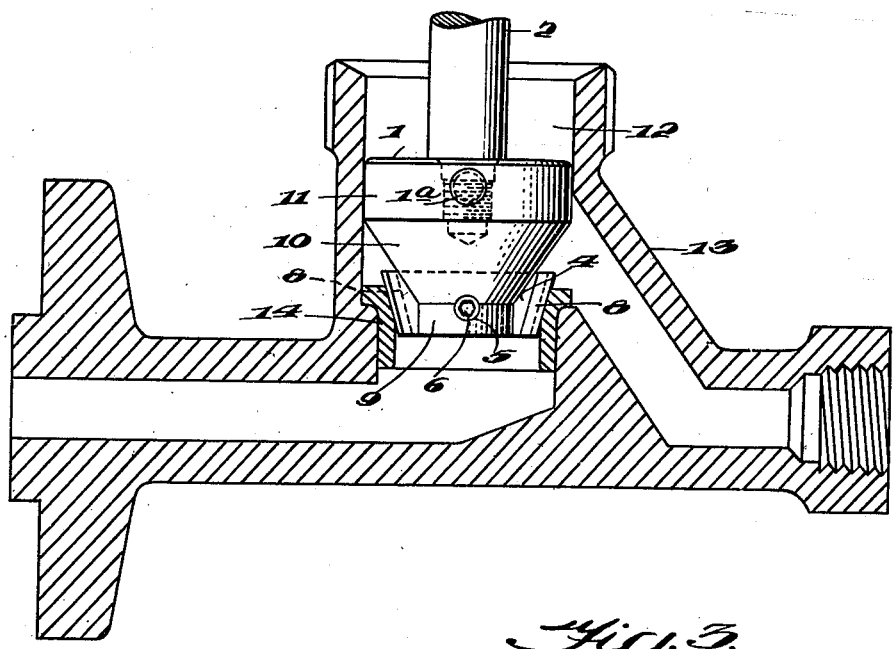
Figure 1 is a vertical sectional view of a standard type of valve with the valve stem and cap removed and showing the cutter head therein.
Figure 2:
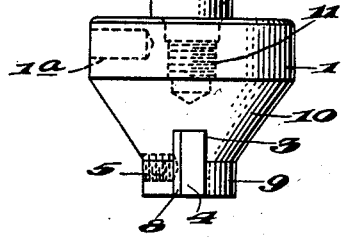
Figure 2 is a side elevational view of the cutter head and adjacent portions of the spindle of the tool, the view being taken at right angles with respect to the position of the cutter head shown in Figure 1.
Figure 3:
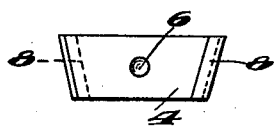
Figure 3 is a side elevational view of a suitable cutting blade for use with the cutter head.
Figure 4:
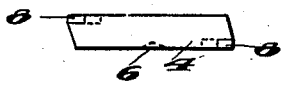
Figure 4 is a plan view of the cutting blade.

Referring more particularly to the drawing, I indicates the cutter head which is preferably formed in its upper end with a screw threaded socket whereby it may be threaded on and thus be rigidly connected with the lower end of a revoluble spindle 2 of a valve resurfacing tool of any desired construction. A radially extending recess 1a is formed in the side of the head to receive a pin spanner or other suitable tool whereby the head may be easily rotated with respect to the spindle.

The lower portion of the head 1 is provided with a diametral slot 3 for receiving a cutting blade 4. The blade may be rigidly secured within the slot 3 in the desired position by a set screw 5 whose inner end is preferably pointed so as to extend within a suitable depression 6 in the adjacent side of the cutting blade and thus center the latter. The outer end of the set screw may be conveniently formed with a hexagonal recess 7 whereby it may be easily rotated. The cutting edges of the blade 4 converge downwardly at an angle corresponding with that of the valve seat to be resurfaced and they may be conveniently provided with hardened inserts 8 of any suitable material, such, for example, as tantalum carbide.

In order that cutting blades of various lengths having cutting edges respectively disposed at a variety of angles may be used with the head and yet be sufficiently backed up thereby so as to eliminate chattering and other undesirable effects resulting from the use of cutting tools unprovided with sufficient backing, the head is formed with a lower cylindrical portion 9 and an intermediate inverted conical portion 10. The lower cylindrical portion 9 extends axially for only a limited distance, preferably about one-half of the depth of the blade receiving slot 3 so that the slot may extend for a substantial distance into the conical portion 10 of the head. With this arrangement, the head will be found to afford an adequate backing for a variety of sizes and shapes of blades.

The conical portion 10 of the head continues upwardly above the upper edge of the blade receiving slot 3 and terminates in a substantially cylindrical portion 11 which, by cooperating with the throat 12 of the valve body 13 of the conventional type of valve shown in Figure 1 (wherein the cutting blade 4 is shown in operative engagement with the valve seat 14 to be resurfaced), functions as a pilot for centering the head with respect to the valve seat. By locating the pilot above the cutter instead of below it as is customary in valve resurfacing tools now in use, the spindle 2 is more effectively supported and undesirable vibrations which might otherwise be imparted from the spindle to the cutting head and thus to the blade are eliminated for all practical purposes. This arrangement also enables the upper cylindrical portion constituting the pilot to be of greater diameter than the lower cylindrical portion 9 so as to form a very effective bearing for the lower end of the spindle 2, and it results in the production of a simpler and more inexpensive head since the pilot and cutter holder may be formed as a single unitary member.

What I claim is:

1. A cutter head for attachment to the lower end of a revoluble spindle of a valve seat resurfacing tool, said head constituting a unitary cutting blade holder and pilot and comprising a lower conical portion provided with a diametral slot for receiving a cutting blade and an upper cylindrical portion concentric with the axis of rotation of said spindle for centering the head with respect to the valve seat to be operated upon, the diameter of said cylindrical portion being greater than the length of said slot.

2. A cutter head for attachment to the lower end of a revoluble spindle of a valve seat resurfacing tool, said head comprising a unitary member having a cylindrical portion adjacent its lower end, a cylindrical portion adjacent its upper end and a conical portion intervening between said cylindrical portions, said lower cylindrical portion and a part of said conical portion being provided with a diametral slot for receiving a valve seat cutting blade and said upper cylindrical portion being of greater diameter than the lower cylindrical portion and being adapted to center the head with respect to the valve seat to be operated upon.

FREDERICK A. DEXTER.